(12) United States Patent
Kohavi

(10) Patent No.: US 6,182,058 B1
(45) Date of Patent: Jan. 30, 2001

(54) BAYES RULE BASED AND DECISION TREE HYBRID CLASSIFIER

(75) Inventor: Ron Kohavi, Mountain View, CA (US)

(73) Assignee: Silicon Graphics, Inc., Mountain View, CA (US)

(*) Notice: Under 35 U.S.C. 154(b), the term of this patent shall be extended for 0 days.

(21) Appl. No.: 08/810,217

(22) Filed: Feb. 28, 1997

(51) Int. Cl.$^7$ .................................................. G06F 17/00
(52) U.S. Cl. ................................................ 706/45; 706/20
(58) Field of Search .................................... 382/225, 227, 382/236; 706/25; 704/250

(56) References Cited

U.S. PATENT DOCUMENTS

| | | |
|---|---|---|
| 3,816,726 | 6/1974 | Sutherland et al. . |
| 4,719,571 | 1/1988 | Rissanen et al. ................... 364/300 |
| 4,868,771 | 9/1989 | Quick et al. . |
| 4,928,247 | 5/1990 | Doyle et al. . |
| 4,994,989 | 2/1991 | Usami et al. . |
| 5,043,920 | 8/1991 | Malm et al. . |
| 5,072,395 | 12/1991 | Bliss et al. . |

(List continued on next page.)

OTHER PUBLICATIONS

Aha, D.W. et al., "Instance–Based Learning Algorithms," *Machine Learning*, vol. 6, No. 1, pp. 37–66 (Jan. 1991).

Almuallim, H. and Dietterich, T.G., "Learning Boolean Concepts in the Presence of Many Irrelevant Features," *Artificial Intelligence*, vol. 69, Nos. 1–2, pp. 279–305 (Sep. 1994).

"Angoss Software Announces Knowledge Studio Data Mining Solution," http://www.pathfinder.com@@xIEkOgYAVjbJZjkM/money/latest/press/PW/1997Oct27/92, Angoss Software Corporation, pp. 1–2, Oct. 1997.

"Angoss Software's KnowledgeSEEKER(™) Compatible with SAS Institute," http://www.newswire,careleases/September1977/18/c3915.html. pp. 1–2, Canada Newswire, Sep. 1997.

(List continued on next page.)

Primary Examiner—Tariq R. Hafiz
Assistant Examiner—Wilbert L. Starks, Jr.
(74) Attorney, Agent, or Firm—Sterne, Kessler, Goldstein & Fox P.L.L.C.

(57) ABSTRACT

The present invention provides a hybrid classifier, called the NB-Tree classifier, for classifying a set of records. According to the present invention, the NB-Tree classifier includes a Decision-Tree structure having zero or more decision-nodes and one or more leaf-nodes. At each decision-node, a test is performed based on one or more attributes. At each leaf-node, a classifier based on Bayes Rule classifies the records. Furthermore, the present invention provides a method for inducing the NB-Tree classifier from a set of labeled instances. To induce the NB-Tree classifier, a utility $C_1$ of a Bayes classifier at a root-node is first estimated. Next, a utility $D_1$ of a split into a plurality of child-nodes with a Bayes classifier at the child-nodes is estimated. The utility of a split is the weighted sum of the utility of the child-nodes, where the weight given to a child-node is proportional to the number of instances that go down that child-node. Next, it is determined if $C_1$ is higher than $D_1$. If $C_1$ is higher than $D_1$, the root-node is transformed into a leaf-node with a Bayes classifier. If $C_1$ is not higher than $D_1$, the root-node is transformed into a decision-node, and the instances are partitioned into a plurality of child-nodes. The method then recursively performs the previous steps for each child-node as if it is a root-node. The present invention approximates whether a generalization accuracy for a Naive-Bayes classifier at each leaf-node is higher than a single Naive-Bayes classifier at the decision-node. According to one embodiment of the present invention, to avoid splits with little value, a split is defined to be significant if the relative (not absolute) reduction in error is greater than 5% and there are at least 30 instances in the node.

13 Claims, 8 Drawing Sheets

U.S. PATENT DOCUMENTS

| | | |
|---|---|---|
| 5,150,457 | 9/1992 | Behm et al. . |
| 5,164,904 | 11/1992 | Sumner . |
| 5,201,047 | 4/1993 | Maki et al. ............................ 395/600 |
| 5,247,666 | 9/1993 | Buckwold ............................ 395/600 |
| 5,251,131 | 10/1993 | Masand et al. ................. 364/419.08 |
| 5,253,333 | 10/1993 | Abe ........................................ 395/62 |
| 5,282,262 | 1/1994 | Kurashige . |
| 5,295,243 | 3/1994 | Robertson et al. . |
| 5,303,388 | 4/1994 | Kreitman et al. ..................... 395/159 |
| 5,307,456 | 4/1994 | MacKay . |
| 5,325,445 * | 6/1994 | Herbert ................................ 382/225 |
| 5,418,946 | 5/1995 | Mori ..................................... 395/600 |
| 5,420,968 | 5/1995 | Johri ..................................... 395/133 |
| 5,426,780 | 6/1995 | Gerull et al. .......................... 395/600 |
| 5,459,829 | 10/1995 | Doi et al. . |
| 5,463,773 | 10/1995 | Sakakibara et al. ................. 395/600 |
| 5,515,486 | 5/1996 | Amro et al. .......................... 395/137 |
| 5,519,865 | 5/1996 | Kondo et al. ......................... 395/600 |
| 5,528,735 | 6/1996 | Strasnick et al. ..................... 395/127 |
| 5,546,529 | 8/1996 | Bowers et al. ........................ 395/159 |
| 5,553,163 * | 9/1996 | Nivelle ................................. 382/227 |
| 5,555,354 | 9/1996 | Strasnick et al. ..................... 395/127 |
| 5,604,821 * | 2/1997 | Ranganathan et al. .............. 382/236 |
| 5,634,087 * | 5/1997 | Mammone et al. ................... 706/25 |
| 5,659,731 | 8/1997 | Gustafson ............................ 395/604 |
| 5,671,333 | 9/1997 | Catlett et al. ........................... 395/20 |
| 5,671,381 | 9/1997 | Strasnick et al. ..................... 395/355 |
| 5,675,711 | 10/1997 | Kephart et al. ......................... 395/22 |
| 5,675,785 | 10/1997 | Hall et al. ............................. 395/613 |
| 5,675,786 | 10/1997 | McKee et al. ........................ 395/614 |
| 5,678,015 | 10/1997 | Goh ...................................... 395/355 |
| 5,680,476 | 10/1997 | Schmidt et al. ...................... 382/159 |
| 5,694,524 | 12/1997 | Evans ...................................... 395/77 |
| 5,696,964 | 12/1997 | Cox et al. ............................. 395/605 |
| 5,706,495 | 1/1998 | Chadha et al. ....................... 395/602 |
| 5,724,573 | 3/1998 | Agrawal et al. ...................... 395/606 |
| 5,727,199 | 3/1998 | Chen et al. ........................... 395/606 |
| 5,732,230 | 3/1998 | Cullen et al. ......................... 395/339 |
| 5,737,487 * | 4/1998 | Bellegarda et al. .................. 704/250 |
| 5,748,852 | 5/1998 | Mahler ................................... 395/61 |
| 5,787,274 | 7/1998 | Agrawal et al. ...................... 395/613 |

OTHER PUBLICATIONS

Cestnik, B., "Estimating Probabilities: A Crucial Task in Machine Learning," *Proceedings of the 9th European Conference on Artificial Intelligence*, pp. 147–149 (Aug. 1990).

"Companies in Data Mining and Knowledge Discovery," http://kdnuggets.com/companies.html, pp. 1–4, Last updated: Oct. 31, 1997.

Cormen, T.H., et al., *Introduction to Algorithms*, The MIT Press, pp. 263–280 (1990).

Dasarathy, B.V., "Nearest Neighbor (NN) Norms: (NN) Patterns Classification Techniques," (IBL), *IEEE Computer Society Press*,pp. 1–30 (1990).

"Data Mining and Knowledge Discovery References," http://kdnuggets.com/references.html, pp. 1–3, Last updated: Oct. 29, 1997.

Domingos, P. and Pazzani, M., "Beyond Independence: Conditions for the Optimality of the Simple Bayesian Classifier," *Machine Learning: Proceedings of the 13th International Conference* (ICML '96), pp. 105–112 (1996).

Fairchild, K.M., "Information Management Using Virtual Reality–Based Visualizations," *Virtual Reality Applications and Explorations*, ed. A. Wexelblat, Academic Press, Inc., pp. 45–74, Copyright (1993), Publication date Jul. 1, 1993.

Fisher, R.A., "The use of multiple measurements in taxonomic problems," *Annals of Eugenics*, vol. 7., No. 1, pp. 179–188 (1936).

Friedman, J. H. et al., "Lazy Decision Trees," *Proceedings of the Thirteenth National Conference on Artificial Intelligence*, AAAI Press and the MIT Press, vol. 1, pp. 717–724 (1996).

Good, I.J., *The Estimation of Probabilities: An Essay on Modern Bayesian Methods*, pp. xi–xii, MIT Press, pp. 1–79, (1965).

"IBM Digs Deep for Data Mining 'Gold'," http://www.software.ibm.com/data/intellimine/factsheet.html, pp. 1–8, IBM Corporation, Copyright 1997.

"KD Mine: Data Mining and Knowledge Discovery," http://kdnuggets.com/index_kdm.html, p. 1, Knowledge Discovery Nuggets, Copyright 1997, Last updated: Oct. 31, 1997.

Kittler, J., "The Role of Feature Selection and Extraction," *Handbook of Pattern Recognition and Image Processing*, Chapter 3, pp. 59–83, Academic Press, Inc., 1986.

Knuth, A., *The Art of Computer Programming*, Addison–Wesley, vol. 2, pp. 506–550 (1973).

Kohavi, R., "Scaling Up the Accuracy of Naive–Bayes Classifiers: a Decision–Tree Hybrid," In *Data Mining and Visulaization*, Silicon Graphics, Inc., from the Second International Conference on Knowledge Discovery and Data Mining (1996).

Kohavi, R., "A Study of Cross–Validation and Bootstrap for Accuracy Estimation and Model Selection," *Proceedings of the 14th International Joint Conference on Artifical Intelligence*, Stanford University, 1995.

Kohavi, R. and John, G., "Wrappers for Feature Subset Selection," http://robotics.stanford.edu/~{ronnyk.gjohn}, May 20, 1997.

Kohavi, R. and Li, C., "Oblivious Decision Trees, Graphs, and Top–Down Pruning," *Proceedings of the 14th International Joint Conference on Artificial Intelligence*, Chriss S. Mellish (Ed.), Morgan Kaufmann Publishers, Inc., pp. 1071–1077 (1995).

Kohavi, R. and Sommerfield, D., "Feature Subset Selection Using the Wrapper Model: Overfitting and Dynamic Search Space Topology," *Proceedings of the First International Conference on Knowledge Discovery and Data Mining*, pp. 192–197 (Aug. 1995).

Kohavi, R. et al., "Data Mining using MLC++: A Machine Learning Library in C++," *Tools With AI*, pp. 234–245 (1996).

Kononenko, I., "Inductive and Bayesian Learning in Medical Diagnosis," *Applied Artificial Intelligence*, vol. 7, pp. 317–337 (1993).

Langley, P. and Sage, S., "Induction of Selective Bayesian Classifiers," *Proceedings on the Tenth Conference on Uncertainty in Artificial Intelligence*, Morgan Kaufmann Publishers, Inc., pp. 399–406 (Jul. 1994).

Langley, P. and Sage, S., "Oblivious Decision Trees and Abstract Cases," *Working Notes of the AAAI—94 Workshop on Case–Based Reasoning*, AAAI Press, pp. 113–117 (1994).

Langley, P., et al., "An Analysis of Bayesian Classifiers," *Proceedings of the Tenth National Conference on Artificial Intelligence*, pp. 223–228 (Jul. 1992).

Lincoff, G., *National Audubon Society Field Guide to North American Mushrooms*, New York, pp. 9–32, (1981).

Mangasarian, O. L. and Wolberg, W. H., "Cancer Diagnosis Via Linear Programming," *SIAM News*, vol. 23, No. 5, pp. 1&18 (Sep. 1990).

Murthy, S. et al., "Randomized induction of oblique decision trees," *Proceedings of the Eleventh National Conference on Artificial Intelligence*, AAI Press/MIT Press, pp. 322–327 (1993).

"Other Web Sites for Data Mining and Knowledge Discovery," http://kdnuggets.com/websites.html, pp. 1–3, Last updated: Sep. 10, 1997.

Quinlan, J.R., *C4.5: Programs for Machine Learning*, Morgan Kaufmann Publishers, Inc., pp. 17–26 (1993).

Quinlan, J.R., "Induction of Decision Trees," *Machine Learning*, vol. 1, No. 1,pp. 81–106 (1986).

Rendell, L. and Seshu, R., "Learning hard concepts through constructive induction: framework and rationale," *Computational Intelligence*, vol. 6, No. 4, pp. 247–270 (Nov. 1990).

"SAS Data Mining Solution," http://www.sas.com/software/data_mining/whitepapers/solution.html, pp. 1–6, SAS Institute Inc., Copyright 1997, Last Updated Sep. 26, 1997.

Schaffer, C., "A Conservation Law for Generalization Performance," *Machine Learning: Proceedings of the Eleventh International Conference*, Morgan Kaufmann Publishers, Inc., pp. 259–265 (1994).

"S*i*ftware: Tools for Data Mining and Knowledge Discovery," http://kdnuggets.com/siftware.html, pp. 1–2, Last updated: Oct. 31, 1997.

Thrun et al., "The Monk's Problems: A Performance Comparison of Different Learning Algorithms," *Technical Report CMU–CS–91–197*, Carnegie Mellon University pp. i–x and 1–112, (1991).

Utgoff, P., "Perceptron Trees: A Case Study in Hybrid Concept Representation," *Proceedings of the Seventh National Conference on Artificial Intelligence*, Morgan Kaufmann, vol. 2, pp. 601–606 (Aug. 1988).

Greenwood, J., "Countdown to the Cybermarket," *Financial Post Magazine*, Mar., 1994, pp. 26–32.

Boyl, J. et al., "Design of a 3D user interface to a database," submitted to Database Issues for Data Visualization Workshop, Jul., 1993, pp. 1–9.

Gershon, N. et al., "Visualization's New Tack: Making Sense of Information," IEEE Spectrum, Nov., 1995, pp. 38–47 and 55.

"Mineset Awards," http://www.sgi.com/Products/software/MineSet/awards.html, p. 1, (Jan. 9, 1998).

"Silicon Graphics MineSet Wins Bronze Miner Award," http://www.sgi.com/Headlines/1997/October/mineset$_{13}$release.html, pp. 1–2, Oct. 1, 1997).

"The 1997 Database Dozen," by D. Stodder, http://www.dbpd.com/96dozen.htm, pp. 1–2, (1996 or 1997).

"A Dozen Companies on the Rise," http://www.dbpd.com/seconddz.htm, pp. 1–9, (Miller Freeman Inc. 1997).

"MineSet 2.0 for Data Mining and Multidimensional Data Analysis," by C. Hall, http://www.sgi.com/Products/software/MineSet/DMStrategies/, pp. 1–12, (1997). (originally appeared in Sep. 1997 issue of *Data Management Strategies*, Copyright 1997 Cutter Information Corp.).

Carlbom et al., "A Hierarchical Data Structure for Representing the Spatial Decomposition of 3–D Objects", *IEEE Computer Graphics & Applications*, Apr. 1985, pp. 24–31.

Carlbom et al., "Planar Geometric Projections and Viewing Transformations" *Computing Surveys*, vol. 10, No. 4, Dec. 1978, pp. 465–502.

Beveaux, T., "Virtual Reality Gets Real", *New Media*, (Jan. 1993), pp. 32–35.

Graves, G.L., "NASA's Virtual Reality", *New Media*, (Jan. 1993), p. 36–38.

Graves, G.L., "Invasive of the Digital Puppets", *New Media*, (Jan. 1993), p. 38–40.

Yavelow, C., "3–D Sound Found In Space", *New Media*, (Jan. 1993), pp. 40–41.

Johnson, Brian and Ben Shneiderman, "Tree–Maps: A Space–Filling Approach to the Visualization of Hierarchical Information Structures", *IEEE Visualization Proceedings '91*, Oct. 1991, pp. 284–291.

Structural Dynamics Research Corporation News Release, "SDRC Announces Software Translator Between CADAM and I–DEAS", Mar. 31, 1992.

Jacobson, Bob, "The Ultimate User Interface", *BYTE*, Apr. 1992, pp. 175, 176, 178, 180, and 182.

Clarkson, Mark A., "An Easier Interface", *BYTE*, Feb. 1991, pp. 277, 278, 280, 281, and 282.

Radding, Alan, "PC GIS: Expect Gain But Also Some Pain", *Computerworld*, Feb. 17, 1992, p. 89.

Hilderbrand, Carol, "GIS Vital In Utility's Duel with Competitor", *Computerworld*, Jan. 20, 1992, p. 43.

Anthes, G.H., "GIS Eases Redistricting Worry", *Computerworld*, Oct. 7, 1991, p. 65.

Alexander, Michael, "GIS Sprouting Corporate Wings", *Computerworld*, Jul. 22, 1991, p. 20.

Wilder, C., "Virtual Reality Seeks Practicality", *Computerworld 26* (17), Apr. 27, 1992, p. 26.

Fairchild, Kim M., Steven E. Poltrock and George W. Furnas, "SemNet: Three–Dimensional Graphic Representations of Large Knowledge Bases", *Cognitive Science and its Applications for Human–Computer Interaction*, Guindon, Ed., 1988, pp. 201–233.

*Precision Visuals International Limited*, "Summary of PV–Wave Point & Click Visual Data Analysis Software", 1991.

Flanagan, William G., "Cyberspace Meets Wall Street", *Forbes*, Jun. 22, 1992, pp. 164, 165, and 168.

Grinstein, G. et al., "Visualization for Knowledge Discovery", *Intl. J. Intelligent Systems* 7, 1992, pp. 637–648.

Fuller, J.E., Using Autocad, 3d Ed., Chapter 17, *Viewing 3–D Drawings*, 1989, pp. 17–1–17–14, and Tutorial, pp. 19–15–19–16, Delmar Publishers, Inc., Albany, NY 12212.

Alexander, M., "Visualizing Cleared–Off Desktops", *Computerworld 25* (18), May 6, 1991, p. 20.

Benedikt, M., ed., *Cyberspace First Steps*, The MIT Press, Cambridge, Massachusetts (1992), pp. 1–436.

Forrest, D., "Seeing Data in New Ways", *Computerworld*, Jun. 29, 1992, pp. 85–86.

Newquist, H.P., "Virtual Reality's Commercial Reality", *Computerworld 26* (3), pp. 93–95.

"Atlas Software: A New Dimension in Data Management", advertisement, Atlas Software, Strategic Mapping, Inc., San Jose, CA 95117 (page and date unknown).

"News: What's New—Business Software", *BYTE*, Mar. 1992, p. 78.

"A Map for All Reasons", advertisement, Strategic Mapping, Inc., San Jose, CA 95117 (page and date unknown).

News Release, Company: Information Builders, Dateline: Pacific Palisades, CA, "Remarkable 3D Main–Frame Graphics Available For PC Users", Feb. 1985.

News Release, Company: Information Builders, Inc., Dateline: Palm Desert, CA, "Information Builders Announces Release 3.0 of PC/Focus DBMS", Jun. 1, 1987.

News Release, Company: Honeywell Bull, Dateline: Bilerica, MA "Relational Software System Increases Integration, Productivity for Honeywell Bull Users", Jul. 17, 1987.

News Release, Company: Alliant Computer Systems, Dateline: San Diego, CA, "TGS' Figaro To Be Marketed With Silicon Graphics", Jul. 8, 1988.

News Release, Company: Alliant Computer Systems, Dateline: Atlanta, GA, "Alliant Debuts New Class of System The Visual Supercomputer", Aug. 2, 1988.

News Release, Company: Virtus, Dateline: Pleasanton, CA, "Individual Software Introduces Training for Microsoft Excel 3.0 Windows and Macintosh Versions", Jul. 31, 1991.

News Release, Company: Virtus Corporation, Dateline: Cary, NC, "Virtus Walkthrough Releases Quicktime Component", Nov. 1, 1991.

News Release, Company: Alias Research, Dateline: Toronto, Ontario, "Alias Ships Sketch!, Freeform 3D Illustration and Design Program", Nov. 15, 1991.

News Release, Company: Structural Dynamics Res. Intl. Business Machines, Dateline: Boston MA, "Alias Sketch (TM) Resumes Shipping: Freeform 3D Illustration and Design Tool", Feb. 19, 1992.

Pollack, A., "The 2–D Screen 3–D World" New York Times (date unknown).

Foley et al., "Computer Graphics: Principals and Practice", Second Edition, Addison–Wesley Publishing Co., 1990, pp. 731–734 and color plate III.23

Ahlberg et al., "IVEE: An Information Visualization & Exploration Environment," Proceedings of Information Visualization '95, 1995, pp. 66–73.

Becker et al., "Smooth Transitions between Bump Rendering Algorithms," *Computer Graphics Proceedings*, Annual Conference Series, 1993, pp. 183–190.

Becker et al., "Unsteady Flow Volumes," *Proceedings of Visualization '95*, pp. 329–335, 1995.

Blinn, James F., "Light Reflection Functions for Simulation of Clouds and Dusty Surfaces," *Computer Graphics*, vol. 16, No. 3, Jul. 1982, p. 116–124.

Crawfis et al., "Texture Splats for 3D Scalar and Vector Field Visualization," *Proceedings of IEEE Visualization '93*, 1993, pp. 261–265.

Crawfis et al., "Vector Field Visualization," *Computer Graphics and Applications*, vol. 14, 1994, pp. 50–56.

Inselberg et al., "Parallel Coordinates: A Tool for Visualizating Multidimensional Geometry," *Proceedings of Visualization '90*, pp. 361–378, 1990.

Laur et al., "Hierarchical Splatting: A Progressive Refinement Algorithm for Volume Rendering," *Computer Graphics*, vol. 25, No. 4, Jul. 1991, pp. 285–288.

Levoy, Marc, "Volume Rendering: Display of Surfaces from Volume Data," *IEEE Computer Graphics and Applications*, vol. 8, No. 5, May 1988, pp. 29–37.

Martin et al., "High Dimensional Brushing for Interactive Exploration of Multivariate Data," *Proceedings of Visualization '95*, 1995, pp. 271–278.

Max et al., "Bump Shading for Volume Textures," *IEEE Computer Graphics and Applications*, Jul. 1994, pp. 18–20.

Max et al., "Flow Volumes for Interactive Vector Field Visualization," *Proceedings of Visualization '93*, 1993, pp. 19–24.

Sabella, Paolo, "A Rendering Algorithm for Visualizing 3D Scalar Fields," *Computer Graphics*, vol. 22, No. 4, Aug. 1988, pp. 51–58.

Stein et al., "Sorting and Hardware Assisted Rendering for Volume Visualization," *IEEE*, 1995, pp. 83–89.

Van Wijk et al., "HyperSlice," *Proceedings of Visualization '93*, 1993, pp. 119–125.

Westover, Lee, "Footprint Evaluation for Volume Rendering," *Computer Graphics*, vol. 24, No. 4, Aug. 1990, pp. 367–376.

Wilhelms et al., "A Coherent Projection Approach for Direct Volume Rendering," *Computer Graphics*, vol. 25, No. 4, Jul. 1991, pp. 275–284.

Wong et al., "Dual Multiresolution HyperSlice for Multivariate Data Visualization," *IEEE Symposium on Information Visualization*, Oct. 1996, pp. 74–75.

Amsbury, W., *Data Structures from Arrays to Priority Queues*, Wadsworth Publishing, Belmont, CA, pp. viii and 331–336, Copyright 1985.

Date et al., *A Guide to SQL/DS*, Addison–Wesley Publishing, New York, NY, pp. xiii and 97–118, Copyright 1989.

Hsiao et al., "Supervised Textured Image Segmentation Using Feature Smoothing and Probabilistic Relaxation Techniques", *IEEE Transactions on Pattern Analysis and Machine Intelligence*, vol. 11, No. 12, pp. 1279–1292, Dec. 1989.

Robert et al., "Continuously Evolving Classification of Signals Corrupted by an Abrupt Change", *IEEE–IMS Workshop on Information Theory and Statistics*, p. 97, Oct. 1994.

Santos–Victor et al., "A Computer Vision System for the Characterization and Classification of Flames in Glass Furnaces", *IEEE Transactions on Industry Applications*, vol. 29, No. 3, pp. 470–478, Jun. 1993.

Taxt et al., "Segmentation of Document Images", *IEEE Transactions on Pattern Analysis and Machine Intelligence*, vol. 11, No. 12, pp. 1322–1329, Dec. 1989.

Hecht–Nielsen, Robert, "Neurocomputing", Addison–Wesley Publishing Company, Inc., Jan. 1990.*

* cited by examiner

FIG. 1
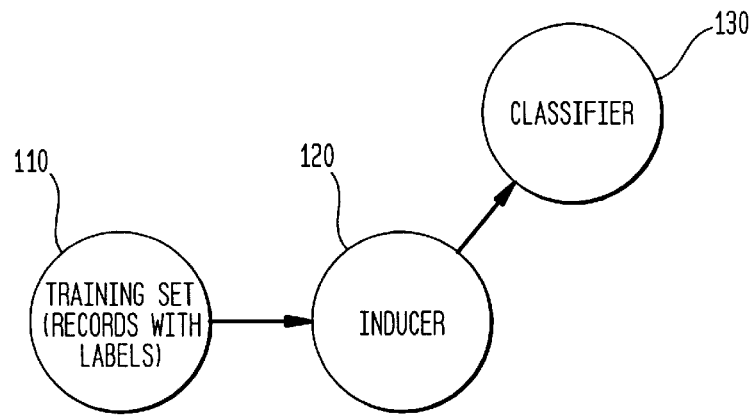
FIG. 2
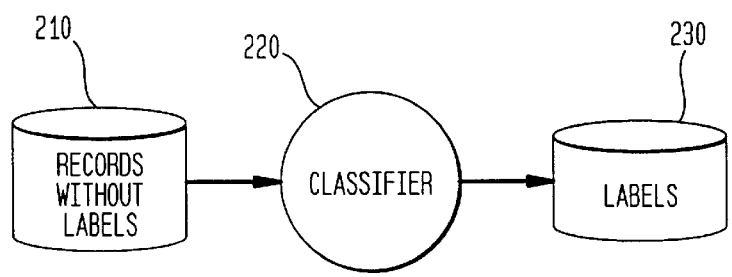
FIG. 3
|  | DESCRIPTIVE ATTRIBUTES | | | | LABEL |
|---|---|---|---|---|---|
|  | sepal_length | sepal_width | petal_length | petal_width | iris_type |
| Record 1 → | 5.1 | 3.5 | 1.4 | 0.2 | Iris-setosa |
| Record 2 → | 5.9 | 3 | 5.1 | 1.8 | Iris-virginica |
| Record 3 → | 6.5 | 2.8 | 4.6 | 1.5 | Iris-versicolor |
| ⋮ | 6.3 | 2.9 | 5.6 | 1.8 | Iris-virginica |
| ⋮ | 6.5 | 3 | 5.8 | 2.2 | Iris-virginica |

FIG. 9

| Dataset | No attrs | Train size | Test size | Dataset | No attrs | Train size | Test size | Dataset | No attrs | Train size | Test size |
|---|---|---|---|---|---|---|---|---|---|---|---|
| adult | 14 | 30,162 | 15,060 | breast(L) | 9 | 277 | CV-10 | breast(W) | 10 | 683 | CV-10 |
| chess | 36 | 2,130 | 1,066 | cleve | 13 | 296 | CV-10 | crx | 15 | 653 | CV-10 |
| DNA | 180 | 2,000 | 1,186 | flare | 10 | 1,066 | CV-10 | german | 20 | 1,000 | CV-10 |
| glass | 9 | 214 | CV-10 | glass2 | 9 | 163 | CV-10 | heart | 13 | 270 | CV-10 |
| ionosphere | 34 | 351 | CV-10 | iris | 4 | 150 | CV-10 | led24 | 24 | 200 | 3,000 |
| letter | 16 | 15,000 | 5,000 | monk1 | 6 | 124 | 432 | mushroom | 22 | 5,644 | 3,803 |
| pima | 8 | 768 | CV-10 | primary-tumor | 17 | 132 | CV-10 | satimage | 36 | 4,435 | 2,000 |
| segment | 19 | 2,310 | CV-10 | shuttle | 9 | 43,500 | 14,500 | soybean-large | 35 | 562 | CV-10 |
| tic-tac-toe | 9 | 958 | CV-10 | vehicle | 18 | 846 | CV-10 | vote | 16 | 435 | CV-10 |
| vote1 | 15 | 435 | CV-10 | waveform-40 | 40 | 300 | 4,700 | | | | |

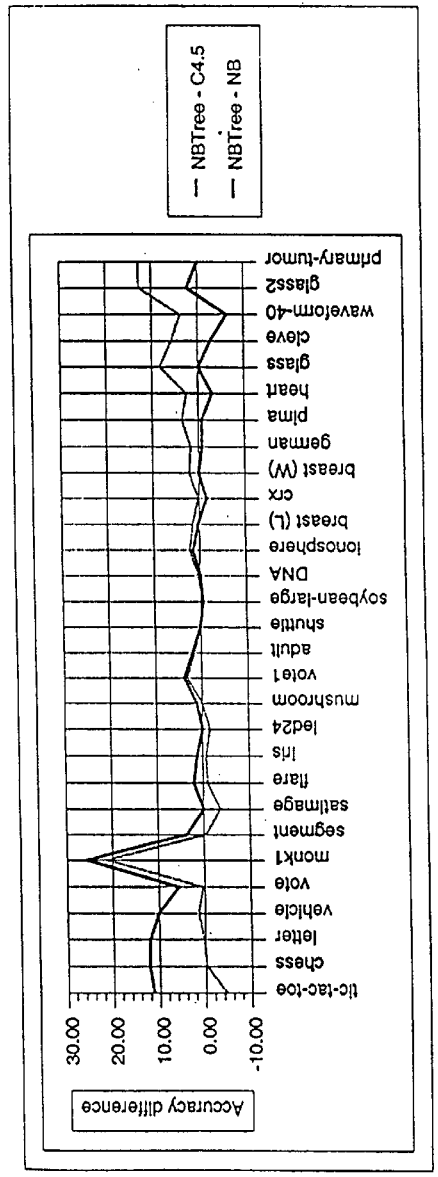

FIG. 10

BAYES RULE BASED AND DECISION TREE HYBRID CLASSIFIER

BACKGROUND OF THE INVENTION

1. Field of the Invention

The present invention relates generally to data mining and more specifically to a classifier and inducer used for data mining.

2. Related Art

Many data mining tasks require classification of data into classes. Typically, a classifier classifies the data into the classes. For example, loan applications can be classified into either "approve" or "disapprove" classes. The classifier provides a function that maps (classifies) a data item (instance or record; records and instances are used interchangeably hereinafter) into one of several predefined classes. More specifically, the classifier predicts one attribute of a set of data given one or more attributes. For example, in a database of iris flowers, a classifier can be built to predict the type of iris (iris-setosa, iris-versicolor or iris-virginica) given the petal length, sepal length and sepal width. The attribute being predicted (in this case, the type of iris) is called the label, and the attributes used for prediction are called the descriptive attributes.

A classifier is generally constructed by an inducer. The inducer is an algorithm that builds the classifier from a training set. The training set consists of records with labels. FIG. 1 shows how an inducer constructs a classifier.

Specifically, FIG. 1 includes a training set 110, an inducer 120 and a classifier 130. The inducer 120 receives the training set 110 and constructs the classifier 130.

Once the classifier is built, its structure can be used to classify unlabeled records as shown in FIG. 2. Specifically, FIG. 2 includes records without labels (unlabeled records) 210, a classifier 220 and labels 230. The classifier 220 receives the unlabeled records 210 and classifies the unlabeled records 210.

Inducers require a training set, which is a database table containing attributes, one of which is designed as the class label. The label attribute type must be discrete (e.g., binned values, character string values, or integers). FIG. 3 shows several records from a sample training set.

Once a classifier is built, it can classify new records as belonging to one of the classes. These new records must be in a table that has the same attributes as the training set; however, the table need not contain the label attribute. For example, if a classifier for predicting iris_type is built, the classifier is applied to records containing only the descriptive attributes. The classifier then provides a new column with the predicted iris type.

In a marketing campaign, for example, a training set can be generated by running the campaign at one city and generating label values according to the responses in the city. A classifier can then be induced and campaign mail sent only to people who are labeled by the classifier as likely to respond, but from a larger population, such as all the U.S. Such mailing can have substantial cost savings.

A well known classifier is the Decision-Tree classifier. The Decision-Tree classifier assigns each record to a class. The Decision-Tree classifier is induced (generated) automatically from data. The data, which is made up of records and a label associated with each record, is called the training set.

Decision-Trees are commonly built by recursive partitioning. A univariate (single attribute) split is chosen for the root of the tree using some criterion (e.g., mutual information, gain-ratio, gini index). The data is then divided according to the test, and the process repeats recursively for each child. After a full tree is built, a pruning step is executed which reduces the tree size.

Generally, Decision-Trees are preferred where serial tasks are involved, i.e., once the value of a key feature is known, dependencies and distributions change. Also, Decision-Trees are preferred where segmenting data into sub-populations gives easier subproblems. Also, Decision-Trees are preferred where there are key features, i.e., some features are more important than others. For example, in a mushroom dataset (a commonly used benchmark dataset), the odor attribute alone correctly predicts whether a mushroom is edible or poisonous with about 98% accuracy.

Although Decision-Tree classifiers are fast and comprehensible, current induction methods based on recursive partitioning suffer from a fragmentation problem. As each split is made, the data is split based on the test and after several levels, there is usually very little data on which to base decisions.

Another well known classifier is the Naive-Bayes classifier. The Naive-Bayes classifier uses Bayes rule to compute the probability of each class given an instance, assuming attributes are conditionally independent given a label.

The Naive-Bayes classifier requires estimation of the conditional probabilities for each attribute value given the label. For discrete data, because only few parameters need to be estimated, the estimates tend to stabilize quickly and more data does not change the model much. With continuous attributes, discretization is likely to form more intervals as more data is available, thus increasing the representation power. However, even with continuous data, the discretization is usually global and cannot take into account attribute interactions.

Generally, Naive-Bayes classifiers are preferred when there are many irrelevant features. The Naive-Bayes classifiers are very robust to irrelevant attributes and classification takes into account evidence from many attributes to make the final prediction, a property that is useful in many cases where there is no "main effect." Also, the Naive-Bayes classifiers are optimal when the assumption that attributes are conditionally independent hold, e.g., in medical practice. On the downside, the Naive-Bayes classifiers require making strong independence assumptions. When these assumptions are violated, the achievable accuracy may asymptote early and will not improve much as the database size increases.

FIG. 4 shows learning curves for the Naive-Bayes and Decision Tree classifiers (a C 4.5 type of decision tree inducer was used) on large datasets from the UC Irvine repository (Murphy & Aha 1996). The learning curves show how the accuracy changes as more instances (training data) are shown to the inducer. The accuracy is computed based on the data not used for training, so it represents the true generalization accuracy. Each point was computed as an average of 20 runs of the algorithm, and 20 intervals were used. The error bars show 95% confidence intervals on the accuracy based on the left-out sample. The top three graphs show datasets where the Naive-Bayes outperformed the Decision-Tree, and the lower six graphs show datasets where the Decision-Tree outperformed the Naive-Bayes. In most cases, it is clear that even with much more data, the learning curves will not cross. While it is well known that no algorithm can outperform all others in all cases, in practice, some algorithms are more successful than others.

SUMMARY OF THE INVENTION

The present invention provides a hybrid classifier, called the NB-Tree hybrid classifier, for classifying a set of records. Each record has a plurality of attributes. According to the present invention, the NB-Tree classifier includes a Decision-Tree structure having zero or more decision-nodes and one or more leafnodes. At each decision-node, a test is performed based on one or more attributes. At each leaf-node, a classifier based on Bayes Rule classifies the records.

The present invention also provides a system and a method of inducing the hybrid classifier from a set of labeled instances. Each instance has a plurality of attributes. The hybrid classifier has a decision-tree structure with zero or more decision-nodes and one or more leaf-nodes. There is one root-node that may either be a decision-node or a leaf-node.

To induce an NB-Tree classifier, a utility $C_1$ of a Bayes classifier at the root-node is first estimated. Next, a utility $D_1$ of a split into a plurality of child-nodes with a Bayes classifier at the child-nodes is estimated. The utility of a split is the weighted sum of the utility of the child-nodes, where the weight given to a child-node is proportional to the number of instances that go down that child-node.

Next, it is determined if $C_1$ is higher than $D_1$. If $C_1$ is higher than $D_1$, the root-node is transformed into a leaf-node with a Bayes classifier and returned. If $C_1$ is not higher than $D_1$, the root-node is transformed into a decision-node, and the instances are partitioned into a plurality of child-nodes. The method then recursively performs the previous steps for each child-node as if it is a root-node.

The present invention approximates whether a generalization accuracy for a Naive-Bayes classifier at each leaf-node is higher than a single Naive-Bayes classifier at the decision-node. According to one embodiment of the present invention, to avoid splits with little value, a split is defined to be significant if the relative (not absolute) reduction in error is greater than 5% and there are at least 30 instances in the node.

Further features and advantages of the invention, as well as the structure and operation of various embodiments of the invention, are described in detail below with reference to the accompanying drawings.

BRIEF DESCRIPTION OF THE FIGURES

The present invention will be described with reference to the accompanying drawings, wherein:

FIG. 1 illustrates an inducer which uses a training set to construct a classifier.

FIG. 2 illustrates a classifier used to classify unlabeled records.

FIG. 3 illustrates several records from a sample training set.

FIG. 9 shows a table which describes the characteristics of the data in a large set of files used in FIGS. 10 and 11.

FIG. 10 is a graph that shows absolute differences between the accuracies for a Decision-Tree (C4.5), a Naive-Bayes and an example NB-Tree hybrid classifier.

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

The present invention provides a hybrid classifier, called the NB-Tree classifier, and a method for using the NB-Tree classifier. Furthermore, the present invention provides a method, system and a computer product for inducing the NB-Tree classifier. The NB-Tree classifier classifies a set of instances (also referred as records; records and instances are used interchangeably hereinafter), each instance having a plurality of attributes. The NB-Tree utilizes the advantages of both Decision-Trees (i.e., segmentation) and Naive-Bayes (evidence accumulation from multiple attributes).

The present invention can be used in computer graphics, data mining environment and data visualization. Given the description herein, it would be obvious to one skilled in the art to implement the present invention in any general computer including, but not limited to, a computer graphics processor (single chip or multichips), high-end to low-end graphics workstations, virtual machine (e.g., Java-created application), and network architectures (e.g., client/server, local, intermediate or wide area networks). In one example, the present invention can be implemented as software, firmware, and/or hardware in a data mining tool, such as, the Mineset product released by Silicon Graphics, Inc., and executed on a graphics workstation manufactured by Silicon Graphics, Inc. (e.g., an Indigo, Indy, Onyx or $O_2$ workstations).

Description in these terms is provided for convenience only. It is not intended that the invention be limited to application in this example environment. In fact, after reading the following description, it will become apparent to a person skilled in the relevant art how to implement the invention in alternative environments.

Figure 4:
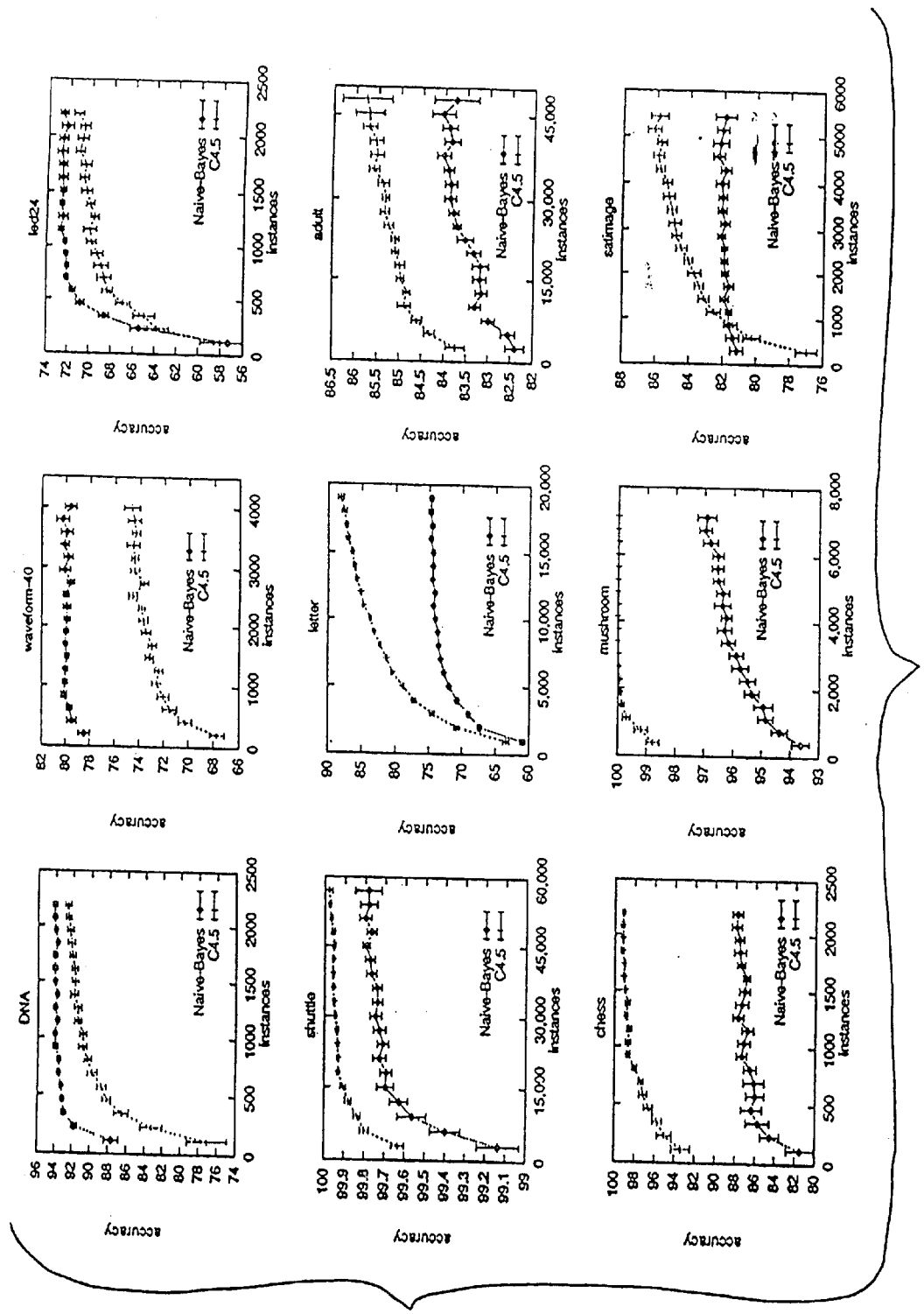
FIG. 4 illustrates learning curves for Naive-Bayes and Decision-Tree classifiers.
Figure 5:
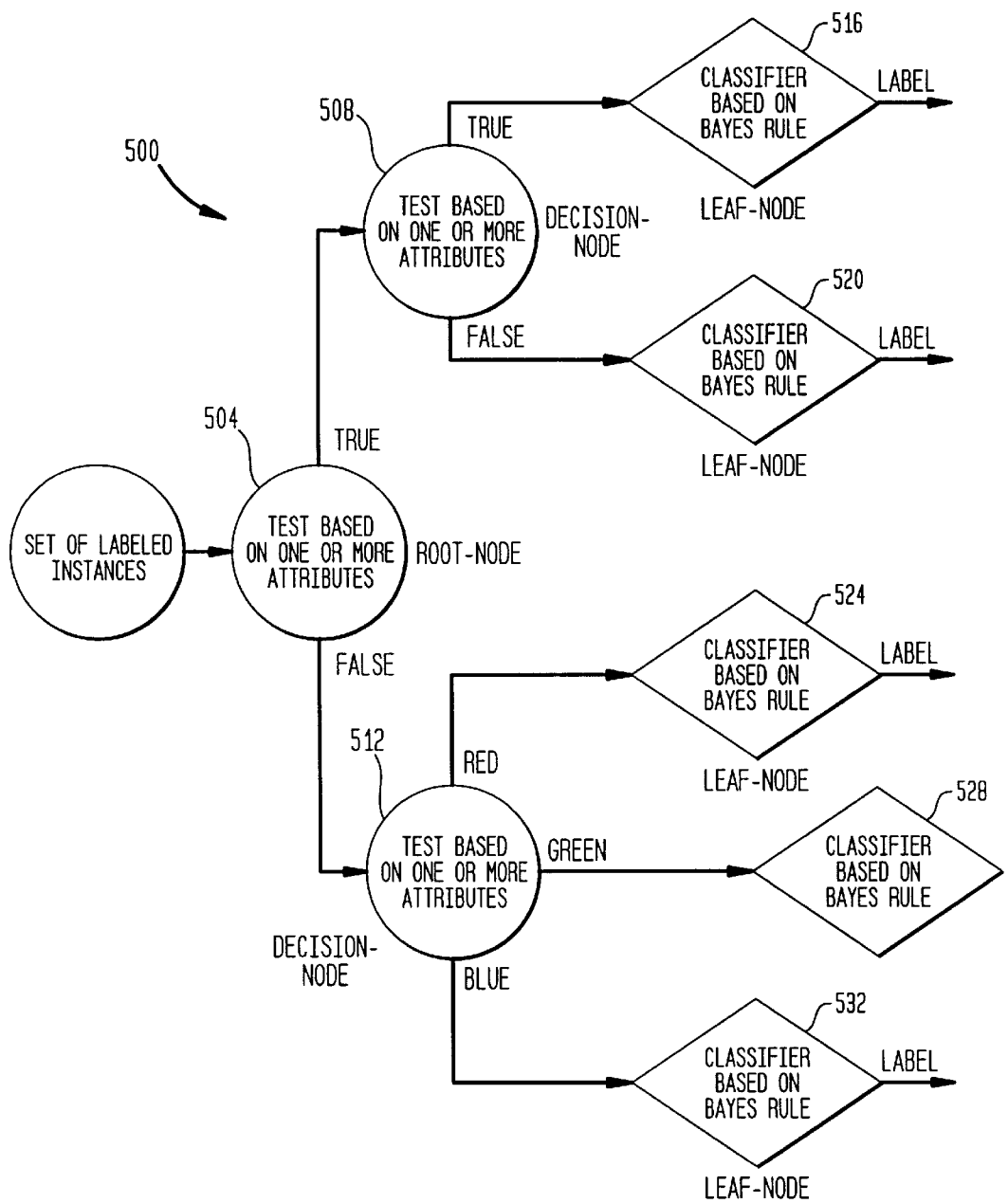
FIG. 5 illustrates an example of a NB-Tree hybrid classifier structure in accordance with one embodiment of the present invention.

FIG. 5 shows an example of a NB-Tree classifier structure 500 in accordance with one embodiment of the present invention. Specifically, the NB-Tree classifier structure 500 includes a root-node 504, decision-nodes 508 and 512, and leaf-nodes 516, 520, 524, 528 and 532.

At the root-node 504, a test based on one or more attributes is performed on a set of labeled instances. Those instances that have the attributes (test result=true, at the root-node 504) are split from those instances that do not have the attributes (test result=false, at the root-node 504). In this example, at the root-node 704, the split is a binary split since the instances are split into two groups. Those instances that have the attributes (test result=true, at the root-node 504) are again tested at the decision-node 508, where the instances are split into true and false. Next, at the leaf-node 516, those instances that have the attributes (test result=true, at the decision-node 508) are classified by a classifier based on Bayes Rule, and the classifier outputs a label.

At the root-node 504, those instances that do not have the attributes (test result=false, at the root-node 504) are tested again at the decision-node 512. At the decision-node 512, a multi-way split is performed based on the attributes. In this example embodiment, those instances that are red are further tested at the leaf-node 524, those instances that are green are further tested at the leaf-node 528 and those instances that are blue are further tested again at the leaf-node 532. At the leaf-node 524 (also at the leaf-nodes 528 and 532), a classifier based on Bayes Rule classifies the instances and outputs a label.

In addition to the classifier structure described above, the present invention discloses an inducer which induces the NB-Tree classifier. As stated before, the NB-Tree classifier is a hybrid of Decision-Tree classifiers and Naive-Bayes classifiers. The approach retains the interpretability of the Naive-Bayes and Decision-Trees, while resulting in classifiers that frequently outperform both constituents, especially in large databases.

Figure 6:
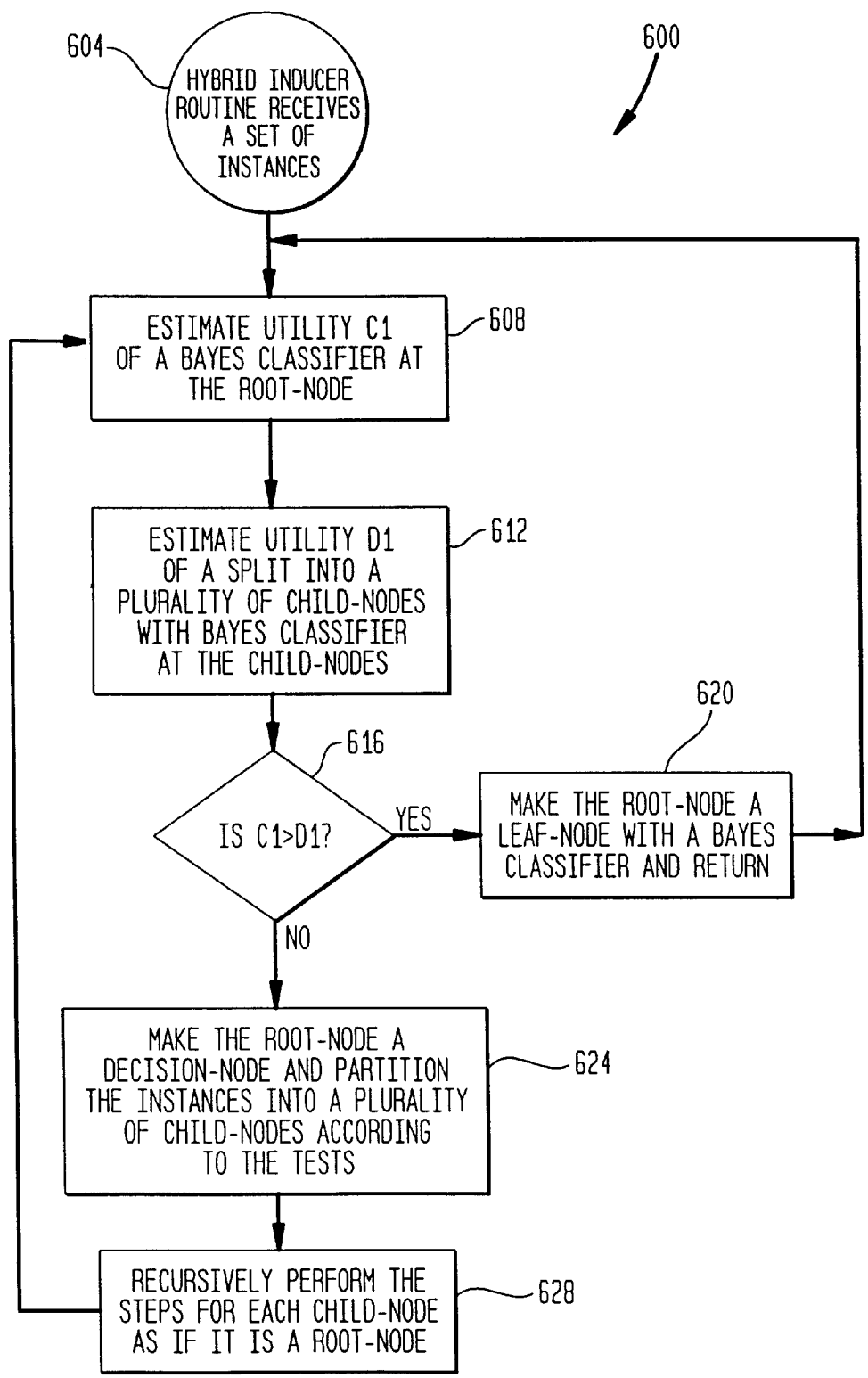
FIG. 6 is a flow diagram illustrating a method of inducing the NB-Tree classifier from a set of labeled instances in accordance with one embodiment of the present invention.

FIG. 6 is a flow diagram 600 illustrating the method of inducing the hybrid classifier, the NB-Tree, from a set of labeled instances in accordance with one embodiment of the present invention. The hybrid classifier has a root-node, zero or more decision-nodes (if necessary), zero or more child-nodes (if necessary) and one or more leaf-nodes. If necessary, the root-node can be transformed into a decision-node or a leaf-node in appropriate circumstances.

Referring to FIG. 6, in a step 604, the hybrid inducer receives a set of labeled instances at the root-node. In a step 608, the utility $C_1$ of a Bayes classifier at the root-node is estimated. The Bayes classifier in this step can be a Naive-Bayes and equivalents thereof.

Next, in a step 612, the utility $D_1$ of a split into a plurality of child-nodes is estimated. The utility estimate of the split can be based on, but not limited to, any type of accuracy estimation, such as holdout, cross-validation or boot-strap. The utility estimate $D_1$ includes an estimated utility of a Bayes classifier at the child-nodes. If the attributes are continuous (i.e., ordered attributes), the step of estimating the utility $D_1$ of a split also includes a determination of a threshold split.

Next, in a step 616, it is determined if $C_1 > D_1$. If $C_1 > D_1$, the flow moves to a step 620, where the root-node is transformed into a leaf-node with a Bayes classifier and the flow is returned to step 604. If $C_1$ is not greater than $D_1$, the flow moves to a step 624, where the root-node is transformed into a decision-node and the instances are partitioned into a plurality of child-nodes. The step 624 may also include a multi-way split, i.e., a non-binary split. Finally, the flow moves to a step 628, where, for each child-node, the flow recursively performs steps 608–628.

Figure 7:
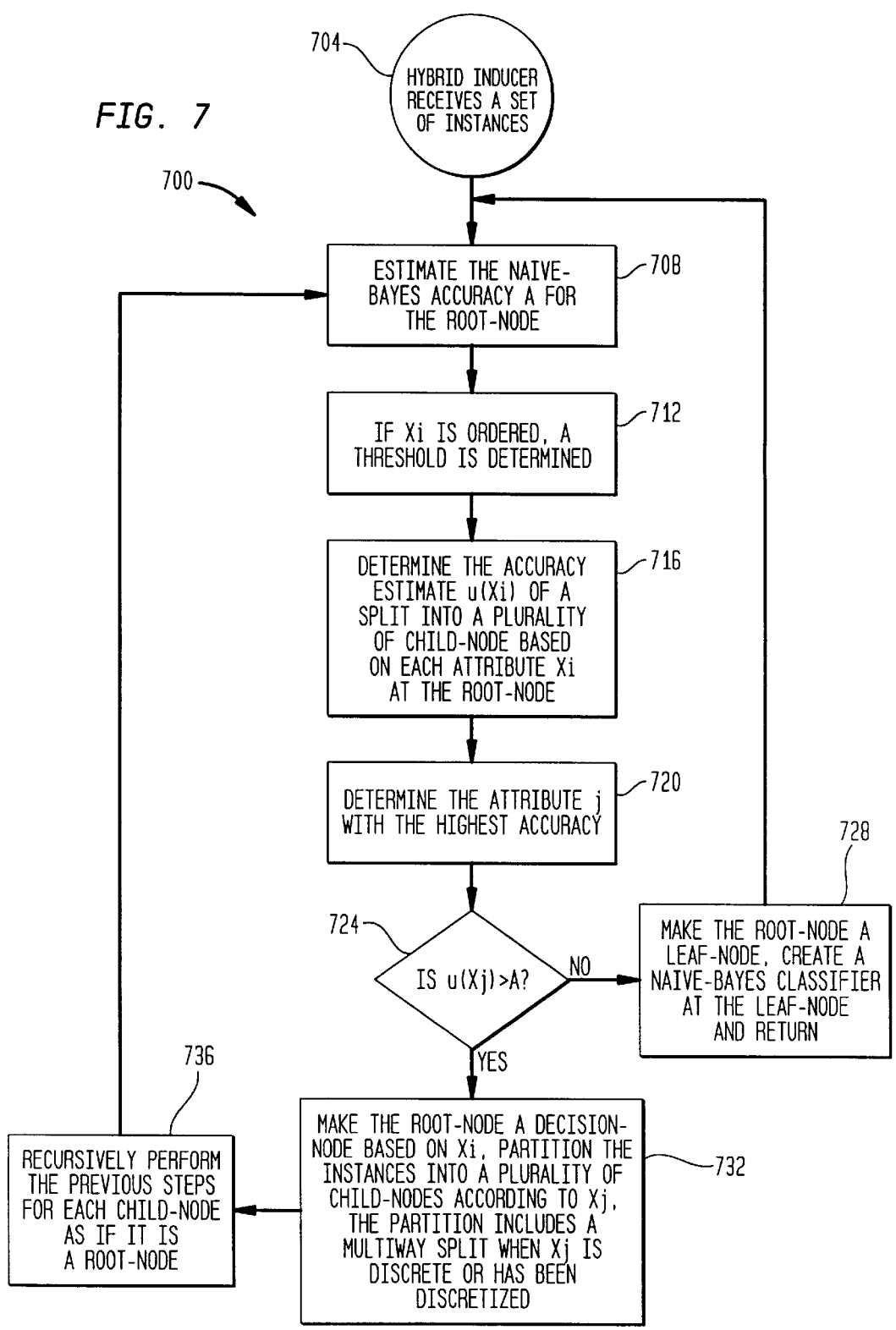
FIG. 7 is a flow diagram illustrating another method of inducing the NB-Tree classifier from a set of labeled instances in accordance with one embodiment of the present invention.

FIG. 7 is a flow diagram 700 illustrating a more specific embodiment of FIG. 6 for inducing a hybrid classifier. The leaf-nodes created are Naive-Bayes classifiers (instead of the more general Bayes classifier) and the decision-nodes make univariate splits (single variable).

According to the method, a threshold for continuous attributes is chosen using the standard entropy minimization technique, as is done for decision-trees. The utility of a node is computed by discretizing the data and computing the 5-fold cross validation accuracy estimate of using the Naive-Bayes at the node. The utility of a split is the weighted sum of the utility of the nodes, where the weight given to a node is proportional to the number of instances that go down to that node.

At each node, an attempt is made to approximate whether the generalization accuracy for a Naive-Bayes classifier at each leaf is higher than a single Naive-Bayes classifier at the current node. To avoid splits with little value, the present invention defines a split to be significant if the relative (not absolute) reduction in error is greater than 5% and there are at least 30 instances in the node.

Direct use of cross-validation to select attributes has not been commonly used because of the large overhead involved in using it in general. However, if the data is discretized, Naive-Bayes can be cross-validated in time that is linear in the number of instances, number of attributes, and number of values. The reason for this is that we can remove the instances, update the counters, classify them and repeat for a different set of instances. Given m instances, n attributes and l label values, the complexity of the attribute selection phase for discretized attributes is $O(m \times n^2 \times l)$. If the number of attributes is less than $O(\log m)$, which is usually the case, and the number of labels is small, then the time spent on attribute selection using cross-validation is less than the time spent sorting the instances by each attribute. Thus, the NB-Tree scales up well to large databases.

Referring to FIG. 7, in a step 704, a hybrid inducer receives a set of instances. In a step 708, the Naive-Bayes accuracy A for the root-node is estimated. If $X_i$ is ordered, a threshold is determined in a step 712.

Next, in a step 716, the accuracy $u(X_i)$ of a split into a plurality of child-node based on each attribute Xi at the root-node is estimated. The accuracy estimate $u(X_i)$ includes an accuracy estimate of a Bayes classifier at the child-nodes.

Next, in a step 720, the attribute j with the highest accuracy is determined. In a step 724, it is determined if $u(X_j) > A$. If $u(X_j)$ is not greater than A, the flow moves to a step 728, where the root-node is transformed into a leaf-node. At the leaf-node, a Naive-Bayes classifier is created and the flow is returned. If $u(X_j) > A$, the flow moves to a step 732, where the root-node is transformed into a decision-node based on $X_i$ and the instances are partitioned into a plurality of child-nodes according to $X_j$. The partition includes a multi-way split when $X_j$ is discrete or has been discretized. Finally, the flow moves to a step 736, where for each child-node, the flow recursively performs the steps 708–736.

Figure 8:
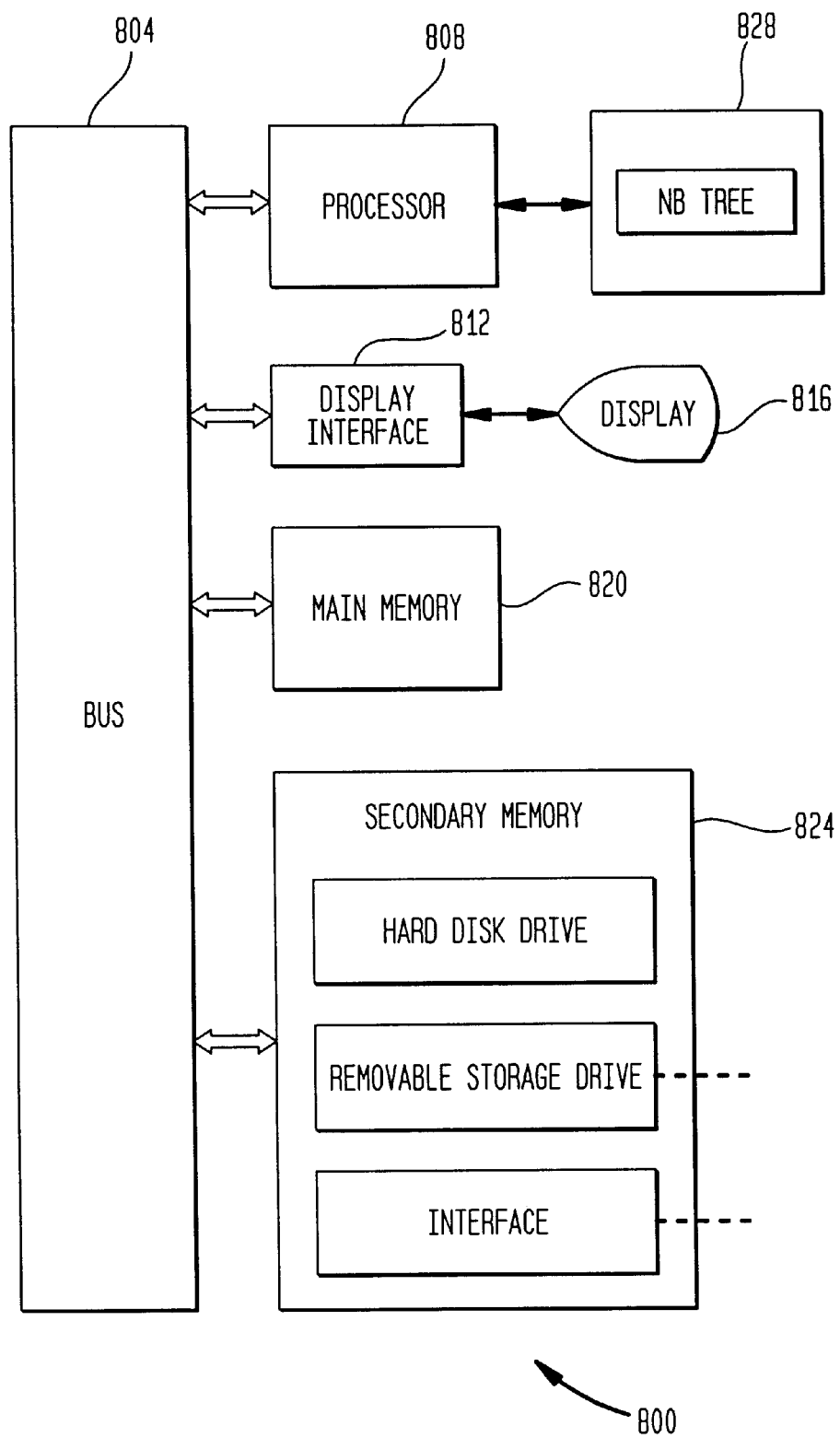
FIG. 8 illustrates a computer system wherein the NB-Tree inducer has been stored.

FIG. 8 shows a computer system 800 wherein the NB-Tree classifier and/or the inducer may be incorporated. The NB-Tree classifier and/or the inducer can reside in a ROM, an EPROM, a programmable controller or any other storing means. Specifically, the computer system 800 includes a bus 804, a main processor 808, a display interface 812, a display 816, a main memory 820, a secondary memory 824 and a NB-Tree classifier and inducer module 828.

Although, in this example, the NB-Tree classifier and inducer 828 resides in a separate module, it may be stored in a programmable controller or inside the processor 808.

In operation, the main processor 808 retrieves the NB-Tree inducer from the module 828. The NB Tree inducer induces a classifier which classifies a set of instances. If the NB-Tree classifier is stored, then it can be used directly to classify a set of instances.

To evaluate the NB-Tree algorithm, a large set of files from the UC Irvine repository was used. FIG. 9 shows a table which describes the characteristics of the data. Artificial files (e.g., monk 1) were evaluated on the whole space of possible values. Files with over 3000 instances were evaluated on a left out sample which is of size one third of the data, unless a specific test set came with the data (e.g., shuttle, DNA, satimage). Other files were evaluated using 10-fold cross-validation. Since C4.5 has a complex mechanism for dealing with unknown values, all instances with unknown values were removed from the datasets prior to the experiments to eliminate the effects of unknown values.

Figure 11:
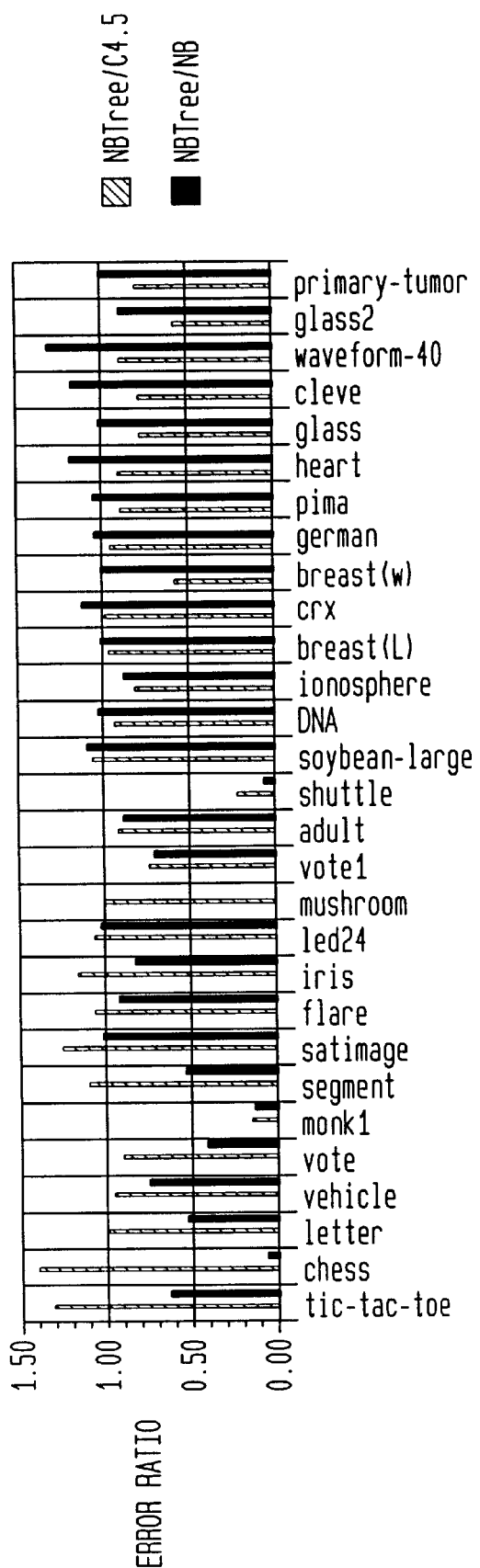
FIG. 11 is a graph that shows the error ratios of an example NB-Tree to the C4.5 and the Naive-Bayes.

FIG. 10 shows the absolute differences between the accuracies for the C4.5, Naive-Bayes and NB-Tree. Each line represents the accuracy difference for the NB-Tree and one of the two other methods. The average accuracy for the C4.5 is 81.91%, for the Naive-Bayes it is 81.69% and for the NB-Tree it is 84.47%. Because the accuracies may be close to 100% in some cases, absolute differences do not tell the whole story. Increasing the accuracy of medical diagnostics from 98% to 99% may cut costs by half because the number of error is halved. FIG. 11 shows the ratio of errors (where error is 100%—accuracy). The shuttle dataset, which is the largest dataset tested, has only 0.04% absolute difference between the NB-Tree and the C4.5, but the error decreases from 0.05% to 0.01%, which is a huge relative improvement.

In this experiment, the number of nodes induced by the NB-Tree was in many cases significantly less than that of the C4.5. For example, for the letter dataset, the C4.5 induced 2109 nodes, while the NB-Tree induced only 251 nodes. In the adult dataset, the C4.5 induced 2213 nodes, while the NB-Tree induced only 137 nodes. For DNA, the C4.5 induced 131 nodes, while the NB-Tree induced 3. For led24, the C4.5 induced 49 nodes, while the NB-Tree used a single node. While the complexity of each leaf in the NB-Tree is higher, ordinary trees with thousands of nodes could be extremely hard to interpret.

In summary, the present invention discloses a hybrid classifier, called the NB-Tree classifier, and a method for using the NB-Tree classifier. Furthermore, the present invention discloses a system, method and a computer product for inducing the NB-Tree classifier. The NB-Tree is a hybrid approach suitable in learning scenarios when many attributes are likely to be relevant for a classification task, yet the attributes are not necessarily conditionally independent given the label.

The NB-Tree inducer induces highly accurate classifiers, significantly improving upon both its constituents in many cases. Although no classifier can outperform others in all domains, the NB-Tree works well on real world datasets that were tested, and it scales up well in terms of its accuracy. In fact, for the three datasets over 10,000 instances (adult, letter, shuttle), it outperformed both the C4.5 and Naive-Bayes.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A hybrid classifier comprising a computer program residing in a computer readable medium for classifying a set of instances, each instance having a plurality of attributes, comprising:
   a decision tree structure having zero or more decision-nodes and one or more leaf-nodes, wherein at each of said decision-nodes, a test is performed based on one or more attributes; and
   a classifier based on Bayes Rule at each of said leaf-nodes, each leaf-node being connected to a decision-node of the decision tree, said classifier classifying said instances at each leaf-node according to Bayes Rule;
   wherein said hybrid classifier outputs a label for each classified instance.

2. A method for executing a hybrid classifier residing in a computer readable medium, said hybrid classifier having at least one decision-node and at least one leaf-node to classify a set of instances, each having a plurality of attributes, the method comprising the steps of:
   performing a test, based on one or more of said attributes, at each of said decision-nodes;
   classifying said instances according to Bayes Rule, at each leaf-node, by processing of a Bayes Rule classifier residing in said computer readable medium; and
   outputting a label for each classified instance.

3. A method of inducing a hybrid classifier from a set of labeled instances, each instance having a plurality of attributes, the method comprising the steps of:
   (a) estimating utility $C_1$ of a Bayes classifier at the root-node;
   (b) estimating utility $D_1$ of a split into a plurality of child-nodes with a Bayes classifier at the child-nodes;
   (c) determining if $C_1$ is higher than $D_1$,
      if $C_1$ is higher than $D_1$, making said root-node a leaf-node with a Bayes classifier;
      if $C_1$ is not higher than $D_1$, making said root node a decision-node, and partitioning the instances into a plurality of child-nodes; and
   (d) recursively performing steps (a) through (c) for each child-node as if it is a root-node to obtain said hybrid classifier;
   wherein said induced hybrid classifier has a root-node, zero or more decision-nodes, zero or more child-nodes and one or more leaf-nodes, said root-node being either a decision-node or a leaf-node; and
   (e) storing said induced hybrid classifier in a computer readable medium.

4. The method of inducing according to claim 3, wherein said Bayes classifier is Naive-Bayes built after all attributes have been discretized.

5. The method of inducing according to claim 3, wherein said utility estimate of a split in step (b) is based on an accuracy estimation selected from the group consisting of at least holdout, cross-validation and bootstrap.

6. The method of inducing according to claim 3, wherein estimating the utility $D_1$ of a split based on one or more attributes further comprises the step of determining a threshold split for ordered attributes.

7. The method of inducing according to claim 3, wherein said partitioning the instances into a plurality of child further comprises the step of performing a multiway split, i.e., a non-binary split.

8. The method of inducing according to claim 3, wherein the utility of a split into a plurality of child-nodes is the weighted sum of the utility of the child-nodes, where the weight given to each child-node is proportional to the number of instances that go down to that node.

9. A method of inducing a hybrid classifier from a set of labeled instances, each instance having a plurality of attributes, the method comprising the steps of:
   (a) estimating the Naive-Bayes accuracy A for the root-node;
   (b) if $X_i$ is ordered, determining a threshold;
   (c) determining the accuracy estimate $u(X_i)$ of a split into a plurality of child-nodes based on each attribute $X_i$ at said root-node;
   (d) determining the attribute j with the highest accuracy, said j=arg $\max_i u(X_i)$, said $u(X_j)$ being the accuracy of the attribute j;

(e) if $u(X_j)$ is not higher than A, making said root-node a leaf-node, creating a Naive-Bayes classifier at said leaf-node, if $u(X_j)$ is higher than A, making said root-node a decision-node based on $X_j$, partitioning the instances into a plurality of child-nodes according to $X_j$, said partitioning includes a multiway split when Xj is discrete or has been discretized; and (f) recursively performing steps (a) through (e) for each child-node $X_j$ as if it is a root-node thereby inducing a hybrid classifier;

wherein said induced hybrid classifier has a root-node, zero or more decision-nodes, zero or more child-nodes and one or more leaf-nodes, said root-node being either a decision-node or a leaf-node; and (g) storing said induced hybrid classifier in a computer readable medium.

10. A system for inducing a hybrid classifier from a set of labeled instances, each instance having a plurality of attributes, said hybrid classifier having a root-node, one or more decision-nodes, one or more child-nodes and one or more leaf-nodes, said root-node being either a decision-node or a leaf-node in appropriate circumstances, comprising:

at least one processor coupled to a storage means, the one at least processor includes:

(a) means for estimating utility $C_1$ of a Bayes classifier at the root-node;

(b) means for estimating utility $D_1$ of a split into a plurality of child-nodes with a Bayes classifier at the child-nodes;

(c) means for determining if $C_1$ is higher than $D_1$;

(d) means for making said root-node a leaf-node with a Bayes classifier if $C_1$ is higher than $D_1$;

(e) means for making said root node a decision-node, and partitioning the instances into a plurality of child-nodes, if $C_1$ is not higher than $D_1$; and (f) means for recursively initiating operation of each of means (a) through (e) for each child-node as if it is a root-node thereby inducing said hybrid classifier which can be stored in said storage means.

11. A computer program product comprising:

a computer readable medium having computer readable program code means embodied in said medium for causing inducement of a hybrid classifier from a set of labeled instances, each instance having a plurality of attributes, said hybrid classifier having a root-node, one or more decision-nodes, one or more child-nodes and one or more leaf-nodes, said root-node being either a decision-node or a leaf-node in appropriate circumstances, said computer program product including:

(a) computer readable program code means for estimating utility $C_1$ of a Bayes classifier at the root-node;

(b) computer readable program code means for estimating utility $D_1$ of a split into a plurality of child-nodes with a Bayes classifier at the child-nodes;

(c) computer readable program code means for determining if $C_1$ is higher than $D_1$;

(d) computer readable program code means for making said root-node a leaf-node with a Bayes classifier if $C_1$ is higher than $D_1$;

(e) computer readable program code means for making said root node a decision-node, and partitioning the instances into a plurality of child-nodes according to the tests if $C_1$ is not higher than $D_1$; and (f) computer readable program code means for recursively initiating operation of each of computer readable program code means (a) through (e) for each child-node as if it is a root-node thereby inducing said hybrid classifier.

12. The hybrid classifier of claim 1, wherein said decision tree structure includes at least one decision node.

13. A hybrid classifier that classifies a set of instances, each instance having a plurality of attributes, the hybrid classifier comprising:

a decision tree structure having zero or more decision-nodes and one or more leaf-nodes, wherein at each of said decision-nodes, a test is performed based on one or more attributes; and a classifier based on Bayes Rule at each of said leaf-nodes, each leaf-node being connected to a decision-node of the decision tree, said classifier classifying said instances at each leaf-node according to Bayes Rule;

wherein said hybrid classifier outputs a label for each classified instance, and wherein said hybrid classifier comprises at least one of software, firmware, and hardware.

* * * * *